United States Patent [19]

Brown

[11] 4,353,500
[45] Oct. 12, 1982

[54] THERMOSTAT

[76] Inventor: George Brown, 317 S. Harbor Dr., Venice, Fla. 33595

[21] Appl. No.: 238,373

[22] Filed: Feb. 26, 1981

[51] Int. Cl.³ .............................................. F01P 7/02
[52] U.S. Cl. .................................... 236/34.5; 137/73; 137/74
[58] Field of Search ...................... 236/34, 34.5, 93 R, 236/101 C, 101 D; 251/212; 137/73, 74, 72; 122/504.1, 504.3; 220/89 B

[56] References Cited

U.S. PATENT DOCUMENTS

| | | | |
|---|---|---|---|
| 1,740,422 | 12/1929 | Snow | 137/73 X |
| 1,747,413 | 2/1930 | Aseltine | 236/34 |
| 1,806,530 | 5/1931 | Giesler | 236/93 R |
| 2,177,937 | 10/1939 | Goldschmidt | 236/34.5 |
| 2,649,272 | 8/1953 | Barbato | 251/212 |
| 2,830,617 | 4/1958 | Brown | 251/212 X |
| 2,960,270 | 11/1960 | Long, Jr. | 236/34 |
| 2,969,142 | 1/1961 | Mack | 251/212 X |
| 3,227,144 | 1/1966 | Sigl | 122/504.1 |

*Primary Examiner*—William E. Tapolcai

[57] ABSTRACT

A thermostat for a cooling system for an automobile engine or the like, comprising an iris diaphragm gate valve member operated by a bimetallic helical operating member to closely control flow of the cooling liquid and engine temperature to effect fuel savings. The thermostat is provided with auxiliary flow openings having fusible plugs therein which are fusible at different predetermined temperatures to more closely control engine temperature and to allow the flow of cooling liquid through the thermostat in the event of failure of the thermostat mechanism.

3 Claims, 5 Drawing Figures

THERMOSTAT

BACKGROUND OF THE INVENTION

Thermostats presently used for automobile engines or the like although they generally serve their intended purpose, are subject to certain disadvantages. First of all, they do not control engine temperature within a sufficiently narrow range to insure efficient engine operation. Secondly, in the event of failure of the thermostat mechanism, the thermostat is closed to prevent the flow of cooling liquid which results in overheating of the engine.

A need has arisen, therefore, for a thermostat that closely controls engine temperature for fuel savings and permits an adequate flow of cooling liquid therethrough to prevent engine overheating in the event of failure of the operating mechanism of the thermostat.

SUMMARY OF THE INVENTION

The thermostat of the present invention is not subject to the above-described disadvantages of known thermostats. It comprises an iris diaphragm gate or valve member operated by a bimetallic operating member to closely control flow of the cooling liquid and engine temperature to effect fuel savings. The thermostat is provided with auxiliary flow openings having fusible plugs therein which are fusible at different predetermined temperatures to more closely control engine temperature and to allow for the flow of cooling liquid through the thermostat in the event of failure of the thermostat mechanism.

The bimetallic helical operating member is constructed to precisely control the position of the gate member to maintain engine temperature within a narrow range to insure efficient engine operation which results in significant fuel savings. Engine temperature is further controlled by the fusing of one or more of the fusible plugs in the auxiliary flow openings. The thermostat of the present invention, therefore, can function to insure efficient operation within different predetermined temperature ranges depending on the operating characteristics of the engine.

DESCRIPTION OF THE PREFERRED EMBODIMENT

The thermostat of the present invention generally comprises a cap member 10, a seat member 12 and a gate member 42.

Figure 1:
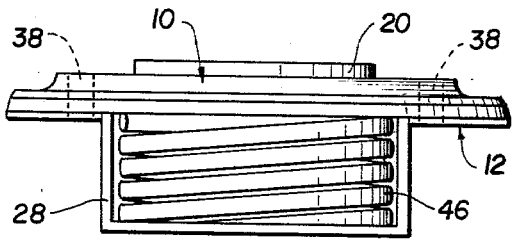
FIG. 1 is a side elevational view of the thermostat of the present invention.
Figure 3:
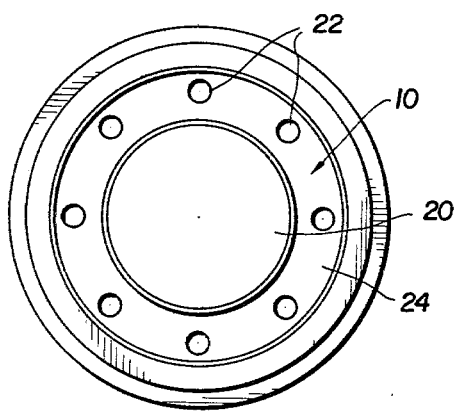
FIG. 3 is a plan view of the thermostat.
Figure 4:
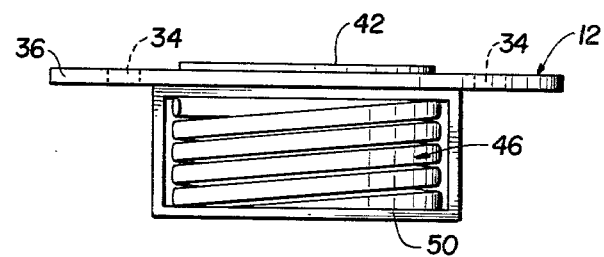
FIG. 4 is a side elevational view of the assembled seat and gate members.

As shown in FIGS. 1 and 3, the cap member 10 comprises a center portion 20 and a peripheral portion 24 having a plurality of openings 22 extending therethrough in substantially equally spaced relation. The center portion 20 and peripheral portion 24 may be connected in any suitable manner so as to define at least one flow opening (not shown) therebetween.

Figure 2:
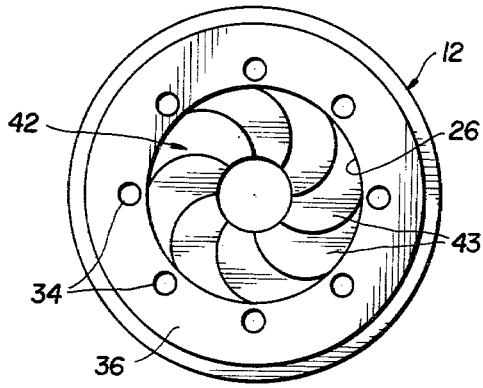
FIG. 2 is a plan view of the assembled seat and gate members with the cap member removed, showing the gate member in an open position.

The seat member 12 comprises a center flow opening 26 and a cage portion 28 extending downwardly therefrom. Also, the seat member 12 comprises a plurality of substantially equally spaced openings 34 in the outer peripheral portion 36 thereof, as shown in FIG. 2. The openings 34 are disposed in alignment with the openings 22 in the cap member 10 when it is assembled with the seat member 12 in any suitable manner.

The aligned and adjacent openings 22 and 34 are closed by fusible plugs 38 (FIG. 1) preferably constructed to fuse at different predetermined temperatures to provide close control of engine temperature for efficient operation and consequent fuel savings.

Figure 5:
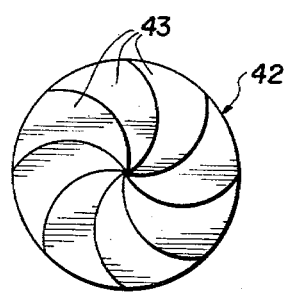
FIG. 5 is a plan view of the iris diaphragm gate member of the thermostat in a closed position.

Referring to FIGS. 1, 2, 4 and 5, the gate member 42 preferably is an iris diaphragm comprising a plurality of relatively movable, arcuate valve or gate sections 43 movably connected together for movement between an open position, such as that shown in FIG. 2, and the closed position shown in FIG. 5 in a manner similar to the shutter used in most cameras at the present time. The gate member 42 is operatively connected to the upper end of a bimetallic helical actuating member 46 formed of any suitable materials. The lower end 50 of the helical actuating member is secured to the base of cage 28 in any suitable manner.

The helical actuating member 46 is mounted for rotation within the cage portion 28 of the seat member 12, and is rotatable in response to temperature changes of the cooling fluid flowing through the thermostat. The rotational movement of the actuating member 46 serves to move the arcuate sections 43 of the gate member 42 and thus controls the opening and closing of the gate member and the flow of cooling fluid through the thermostat. The structure and operation of the gate member 42 enables the flow of cooling fluid therethrough to be closely controlled, with resultant close control of engine temperature.

The center portion 20 of the cap member 10 is spaced above the gate member 42 to allow for the flow of cooling fluid therebetween. The gate member 42 is mounted within the center opening 26 of the seat member 12 and may be formed of any suitable material or materials.

In operation, the helical actuating member 46 is constructed to rotate or move the sections 43 of the gate 42 in response to engine temperature, to closely control the flow of cooling fluid through the gate member, thereby maintaining the engine temperature within predetermined limits for efficient operation and significant fuel savings. In tests conducted by an independent agency on a 225 cu. in. six cylinder automobile engine at 2000 rpm and at 2200 rpm, it has been found that fuel efficiency can drop significantly when the motor operating temperature differs from the peak efficiency temperature. For example, fuel consumption can drop in excess of 6% for a 5° F. change from peak efficiency temperature. This points to the importance of closely controlling the temperature of the cooling fluid with the use of the apparatus of the present invention.

For even closer control of engine temperature, one or more of the fusible plugs in the peripheral openings 22 and 34 of the cap member 10 and seat member 12, respectively, melt preferably at different temperatures to more precisely control flow of cooling fluid through the thermostat. In the event of failure of the operating mechanism of the thermostat, resulting in blockage of cooling fluid flow through the gate member 42, the rise in engine temperature will cause all of the fusible plugs 38 to melt to insure efficient flow of cooling liquid through the thermostat openings 22 and 34 to prevent engine overheating.

What is claimed is:

1. A thermostat, comprising:
   a cap member having a first flow opening therethrough;
   a seat member secured to said cap member and having a second flow opening therethrough;
   a gate member mounted in said second flow opening and having a plurality of gate sections movable between open and closed positions to control the flow of cooling liquid through said gate member; and
   a bimetallic helical actuating member secured to said gate member and to said seat member and being rotatable to move said gate sections in response to predetermined engine temperatures to insure efficient engine operation and fuel savings;
   said cap member being provided with a plurality of third flow openings that are smaller than said first flow opening, and said seat member being provided with a plurality of fourth flow openings that are smaller than said second flow opening, said third and fourth flow openings being of substantially the same size and in adjacent axially aligned relation, and fusible plugs disposed in said third and fourth flow openings, said fusible plugs being fusible at different engine temperatures to more closely control engine temperature and effect fuel savings.

2. The thermostat of claim 1 wherein said gate member is an iris diaphragm with arcuate gate sections that define a substantially central opening therethrough when in an open position.

3. The thermostat of claim 1 wherein said third and fourth flow openings are disposed around the periphery of said cap member and seat member to provide for flow of cooling liquid therethrough in the event of elevated engine temperature resulting from locking of the helical actuating member in a fully closed position.

* * * * *